United States Patent [19]

Machida

[11] Patent Number: 5,307,103
[45] Date of Patent: Apr. 26, 1994

[54] LENS BARREL
[75] Inventor: Kiyosada Machida, Urawa, Japan
[73] Assignee: Nikon Corporation, Tokyo, Japan
[21] Appl. No.: 111,903
[22] Filed: Aug. 26, 1993
[30] Foreign Application Priority Data Sep. 4, 1992 [JP] Japan .................................. 4-263144

[51] Int. Cl.[5] .......................... G03B 1/18; G03B 17/04
[52] U.S. Cl. .................................. 354/195.1; 354/187; 354/195.12
[58] Field of Search ........... 354/195.1, 195.11, 195.17, 354/187; 359/823, 829

[56] References Cited

U.S. PATENT DOCUMENTS 5,198,932  3/1993  Takamura ...................... 354/195.12
5,255,035 10/1993  Kichima ......................... 354/195.12

Primary Examiner—Michael L. Gellner
Assistant Examiner—Nicholas J. Tuccillo
Attorney, Agent, or Firm—Shapiro and Shapiro

[57] ABSTRACT

A lens barrel comprises a fixed cylinder, a driving gear to which torque from a driving member is transmitted, and external gear to be engaged with the driving gear, a rotary cylinder which rotates itself to advance and retreat in the direction of the optical axis with respect to the fixed cylinder, and a lens holding cylinder which is set inside the inner periphery of an end of the rotary cylinder and holds a photographing lens shifted forward and backward in the direction of the optical axis by the rotary cylinder, wherein the driving gear moves forward and backward, which depends on the directions of its own rotation, in the same direction as the rotary cylinder.

3 Claims, 5 Drawing Sheets

LENS BARREL

BACKGROUND OF THE INVENTION

1. Field of the Invention

The present invention relates to a lens barrel which is preferable with respect to thinning a camera body of a camera provided with a shifting lens holding cylinder such as a collapsible barrel type camera.

2. Related Background Art

By collapsing and containing a lens barrel in a camera body, a camera can be thinned when not used. The shifting amount of the lens barrel, however, can not be made greater than the thickness of the camera body. Accordingly, there has been known a camera whole lens barrel is collapsed by two stages in order to further thin the camera body.

FIG. 5 shows a longitudinal section of a conventional lens barrel of zoom lens of two groups type.

In this lens barrel, a gear 106 is provided around the periphery of an intermediate helicoid 106. When torque from a gear 108 connected with a drive motor is transmitted to the gear 106a, the intermediate helicoid 106 is shifted forward and backward according to the lead of a fixed cylinder 107, and at the same time, a lens holding cylinder 105 which holds a photographing lens 101 is shifted forward and backward according to the lead of the intermediate helicoid 106.

In the above-mentioned conventional lens barrel, however, as the shifting amount of the intermediate helicoid 106 in the direction of the optical axis increases, the gear length A of the gear 106a has to be made longer in order to meet the increased shifting amount.

Therefore, if the shifting amount of the intermediate helicoid is increased too much on purpose to thin the camera body without changing the rest of the constitution, the gear 106a can not be contained in the camera body. So, the camera body can not be thinned very much only by increasing the shifting amount of the intermediate helicoid 106 even when the lens barrel is collapsed by two stages.

SUMMARY OF THE INVENTION

The object of the present invention is to provide a lens barrel which can solve the above-mentioned problem and realize a thin body of a camera with a shifting lens holding cylinder.

In order to solve the above-mentioned problem, the lens barrel according to the present invention comprises: a fixed cylinder; a driving gear to which torque from a drive means is transmitted; an external gear to be engaged with said driving gear; a rotary cylinder which rotates itself to advance and retreat in the direction of the optical axis with respect to said fixed cylinder i and a lens holding cylinder which is set inside the inner periphery of said rotary cylinder and holds a photographing lens shifted forward and backward in the direction of the optical axis by said rotary cylinder, wherein said driving gear moves forward and backward, which depends on the directions of its own rotation, in the same direction as said rotary cylinder.

According to the present invention, the driving gear engaged with the external gear of the rotary cylinder is shifted, when rotated, by means of a feed screw, or the like so that the driving gear moves together with the rotary cylinder in the direction of the optical axis. As a result, the shifting amount of the rotary cylinder can be increased without extending the gear length of the external gear engaged with the driving gear.

DESCRIPTION OF THE PREFERRED EMBODIMENT

Now, the present invention will be described below in detail with reference to a preferred embodiment illustrated in the accompanied drawings.

Figure 1:
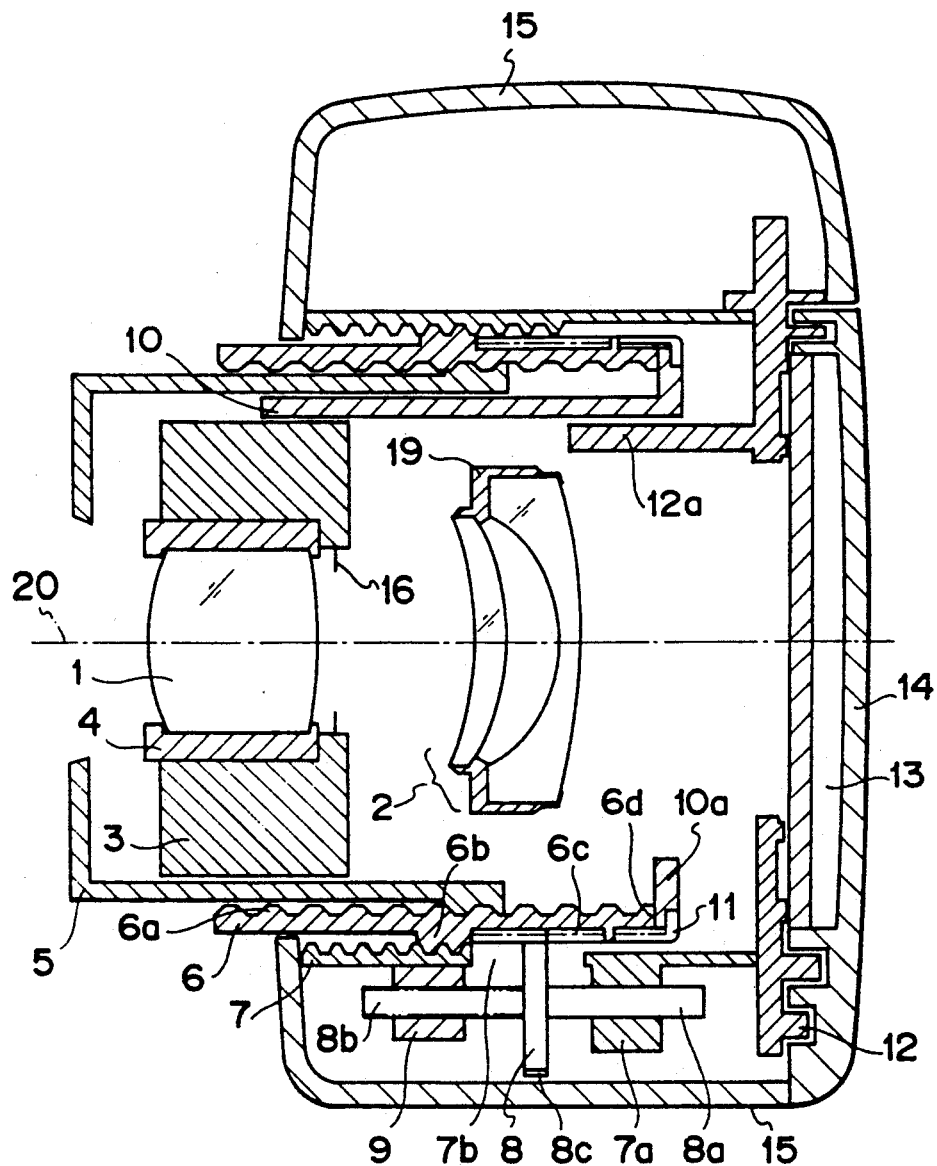
FIG. 1 shows a longitudinal section of an embodiment of the lens barrel according to the present invention, which is in the wide-angle end state.
Figure 2:
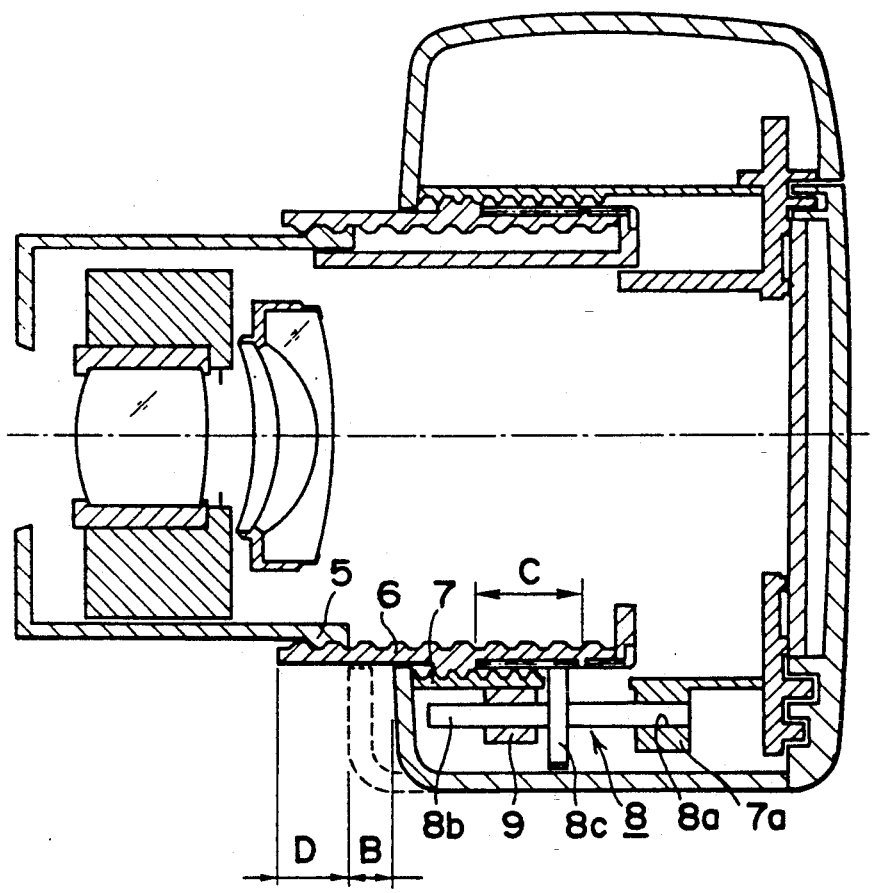
FIG. 2 shows a longitudinal section of the embodiment of the lens barrel according to the present invention, which is in the telephoto end state.
Figure 3:
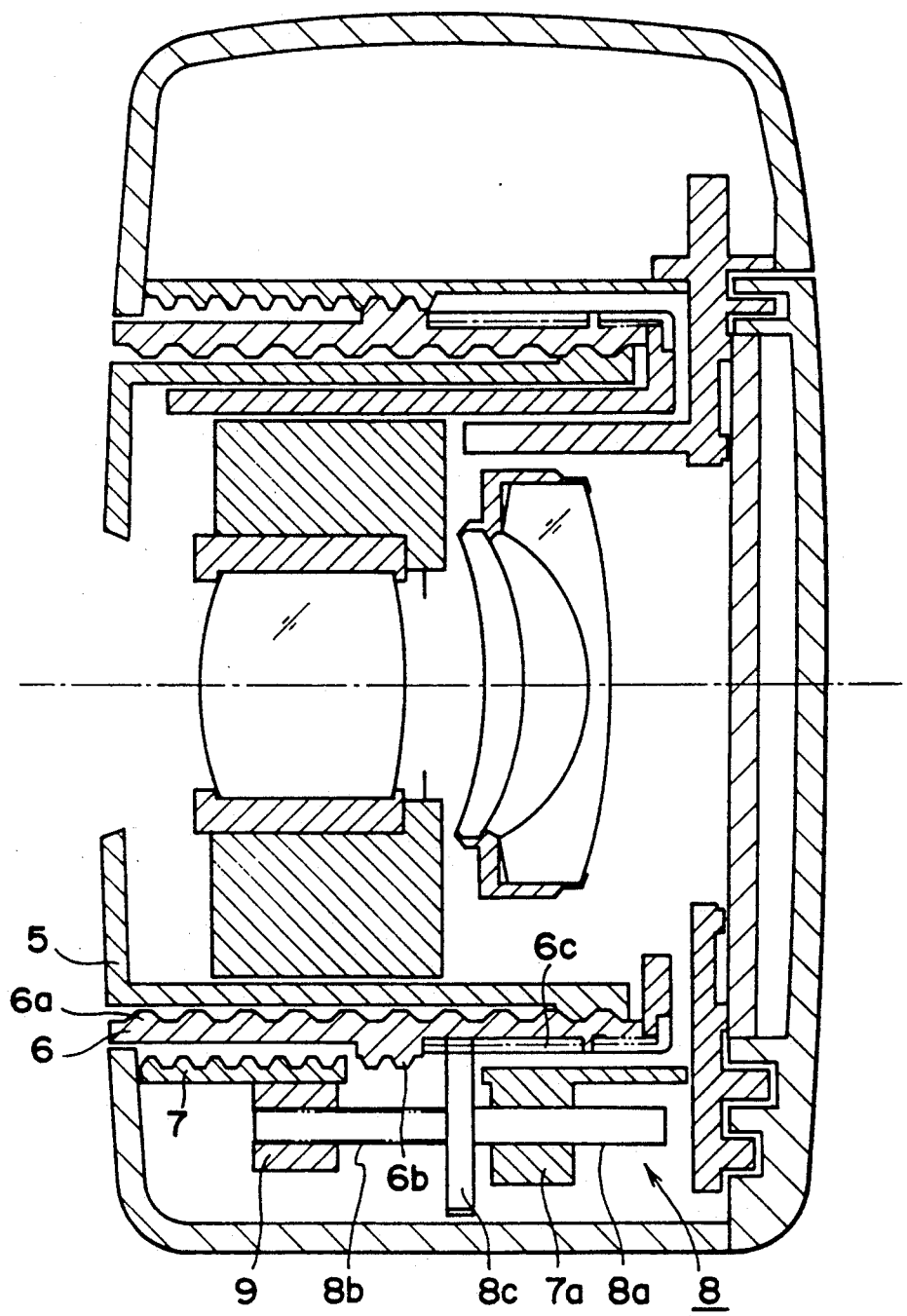
FIG. 3 shows a longitudinal section of the embodiment of the lens barrel according to the present invention, which is in the collapsed state.
Figure 4:
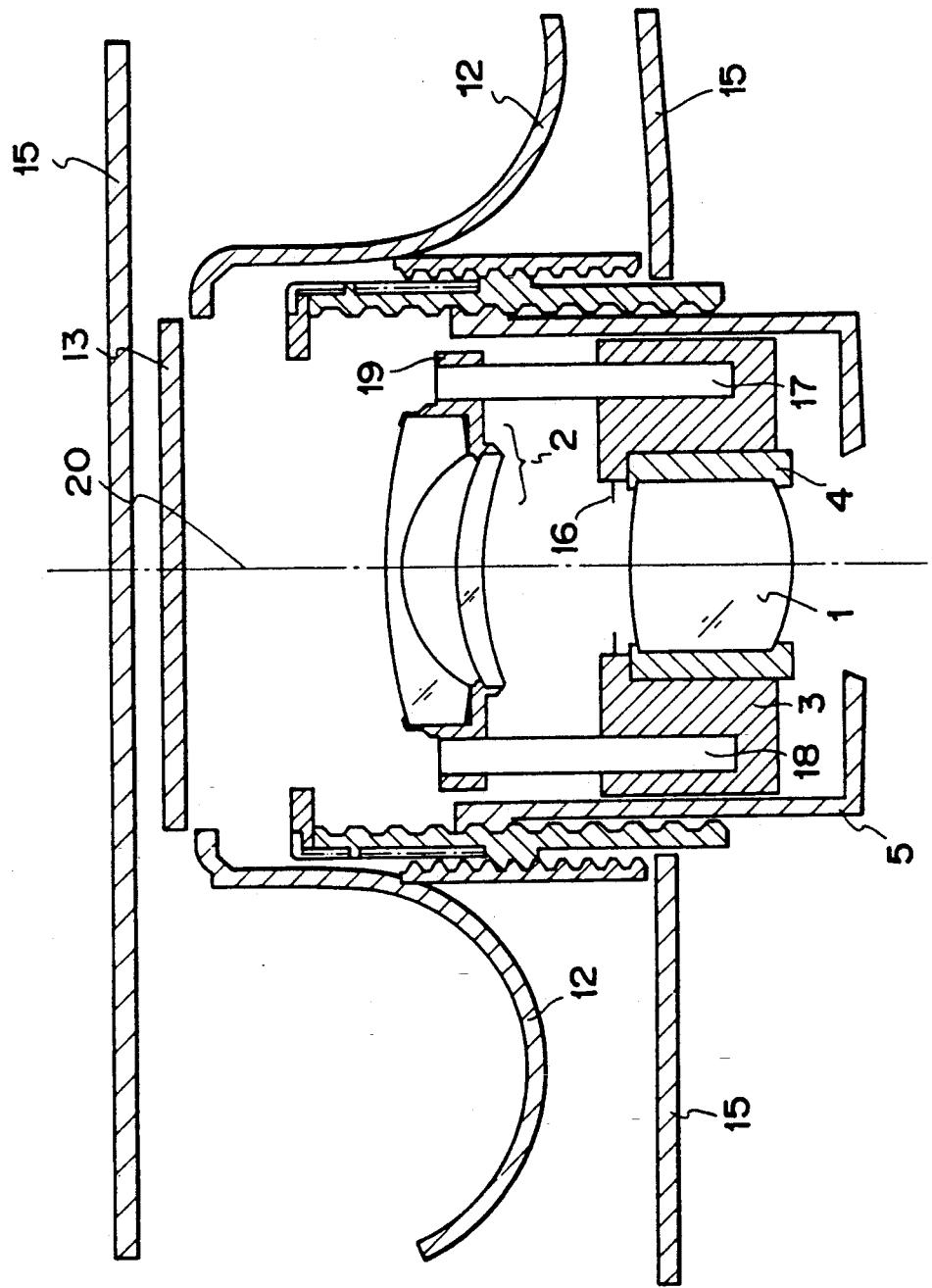
FIG. 4 is a horizontal cross-sectional view of the embodiment of the lens barrel according to the present invention, which is the wide-angle state.

FIGS. 1 to 4 show the embodiment of the lens barrel according to the present invention. FIG. 1 shows a longitudinal section of the embodiment in the wide-angle end state, FIG. 2 shows a longitudinal section in the telephoto end state, FIG. 3 shows a longitudinal section in the collapsed state, and FIG. 4 is a horizontal cross-sectional view showing the wide-angle state.

This embodiment of the lens barrel is applied to a lens shutter camera of zoom lens of two groups type.

Description of Constitution

A lens 1 of a first group is held by a first group holding frame 4 which is provided to a shutter 3. The shutter 3 opens and closes shutter blades 16, and is attached to a lens holding cylinder 5 in a way which is not illustrated in the drawing.

A lens 2 of a second group is, as shown in FIG. 4, held by a second group holding frame 19 which supports on one side a feed screw 17 in parallel with an optical axis as well as on the opposite side a guide shaft 18 also in parallel with the optical axis 20. Inside the shutter 3, a female screw (not shown) to be engaged with the feed screw 17 is provided. As the female screw rotates, the second group lens 2 is shifted in the direction of the optical axis 20.

As shown in FIG. 1, an intermediate helicoid 6 has a helicoid surface 6a engaged with the lens holding cylinder 5 on its inner periphery, helicoid surface 6b engaged with a fixed cylinder 7 on its outer periphery, a gear 6c engaged with a gear 8 also on its outer periphery, and an edge portion 6d which, together with a screw ring 11, supports a linear advance key 10.

The fixed cylinder 7 which has a bearing 7a for the gear 8 and a recess portion 7b therefor is fixed to a camera main body 12 by a means (not shown).

The linear advance key 10 which is supported by the intermediate helicoid 6 and can slide together with the intermediate helicoid 6 in the direction of the optical axis 20 has a curved portion 10a, with which a guide key 12a protruding from the main body is engaged in order to allow the linear advance key to slide only in the direction of the optical axis 20. The lens holding cylinder 5 engaged with the linear advance key 10 can be shifted with respect to the linear advance key 10 in the direction of the optical axis 20 without rotation.

The gear 8 consists of a guide portion 8a, a screw portion 8b and a gear portion 8c. The guide portion 8a is supported by a means (not shown) and fixed to the fixed cylinder 7 so as to slide in the direction of the optical axis 20. The screw portion 8b is engaged with a screw member attached to the fixed cylinder 7. And the gear portion 8c is engaged with the gear 6c of the intermediate helicoid 6.

If the gear 8 rotates, the intermediate helicoid 6 is rotated. At the same time, the gear 8 itself moves in the direction of the optical axis 20 according to the lead of the screw portion 8b.

Incidentally, reference numerals 13, 14 and 15 denote a pressure plate, a back lid and a cover, respectively.

Description of Operation

Next, operation of the lens barrel in this embodiment will be described. As mentioned before, FIG. 1 shows the longitudinal section in the wide-angle end state, FIG. 2 shows the telephoto end state, FIG. 3 shows the collapsed state, and FIG. 4 shows the horizontal section in the wide-angle end.

When the gear 8 is rotated clockwise by a motor contained in a driving means controlled by a control means having a photo-interrupter (which are not shown in the figure) the gear, which is now in the collapsed state shown in FIG. 3, moves toward the x direction according to the lead of the screw portion 8b. At the same time, the intermediate helicoid 6 moves, while rotating, toward the x direction according to the leads of the thread formed on the inner periphery of the fixed cylinder 7 and the screw portion 6b engaged therewith of the intermediate helicoid. In this case, if the lead of the screw portion 8b of the gear 8 is smaller than the lead of the screw portion 6b of the intermediate helicoid 6, the shifting amount can be reduce without changing the shifting amount of the intermediate helicoid 6, which is preferable with respect to realization of a thin camera body.

Subsequently, the lens holding cylinder 5 which is prohibited from rotating by the guide key 12a and the linear advance key 10 moves toward the x direction according to the lead of the helicoid surface 6a until the first group lens 1 reaches a wide-angle position, when the control means (not shown) stops the driving means: the wide-angle end state shown in FIG. 1.

The position of the first group lens 1 is detected by said photo-interrupter of the control means. The second group lens 2 is controlled according to the position of the first group lens 1 by driving the female screw in the shutter 3 (FIG. 4).

When the motor of said driving means further rotates clockwise, the intermediate helicoid 6, the lens holding cylinder 5 and the gear 8, which are now in the wide-angle end state shown in FIG. 1, further move in the x direction, to be in the telephoto end state shown in FIG. 2.

When the motor of said driving means rotates counter clockwise, the above-mentioned movement is reversed: from the telephoto end state in FIG. 2 through the wide-angle end state in FIG. 1, and further to the collapsed state in FIG. 3.

Comparison With Conventional Example

Figure 5:
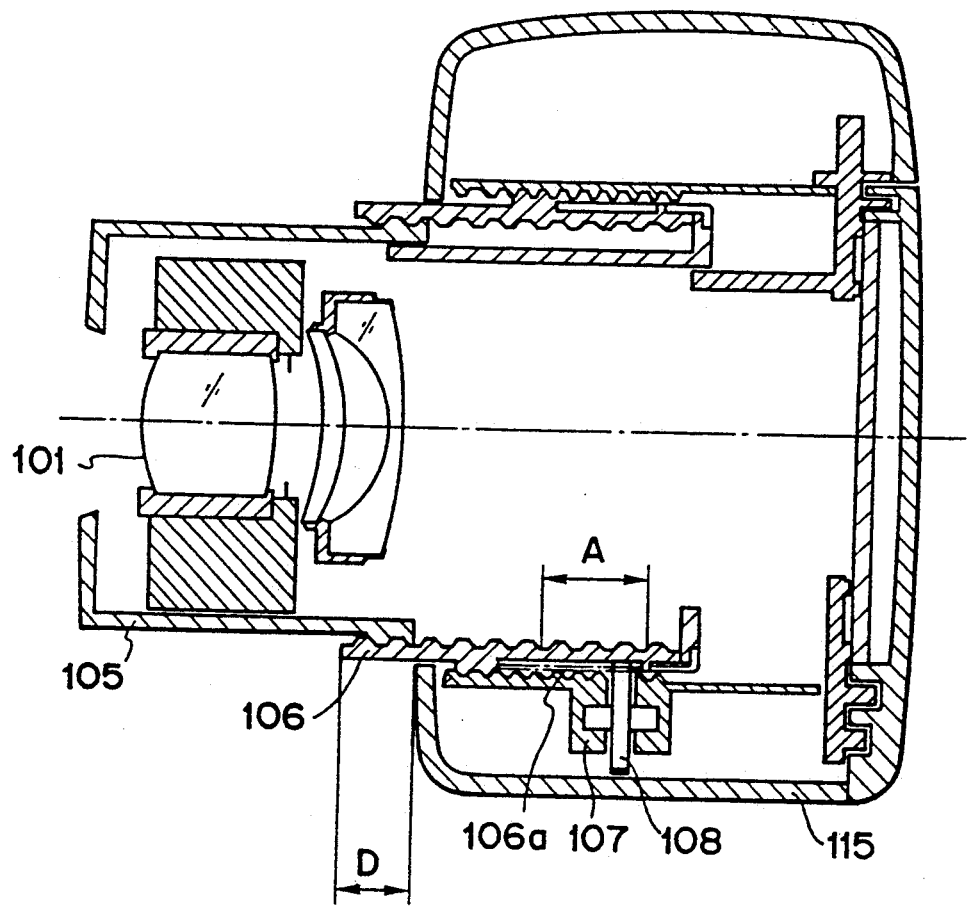
FIG. 5 shows a longitudinal section of a conventional example of a lens barrel of zoom lens of two groups type.

The above-mentioned embodiment will be compared with the conventional example described before and shown in FIG. 5 (which is substantially the same as the above-mentioned embodiment except that the gear 108 does not move in the direction of the optical axis).

Suppose that the gear length A of the gear 106a of the intermediate helicoid 106 in the conventional example is the same as the gear length C of the gear 6c of the intermediate helicoid 6 in this embodiment.

The maximum shifting amount of the intermediate helicoid 106 of the conventional example in the direction of the optical axis is equal to the gear length A minus the gear length of the gear 108 (=D shown in FIG. 5), while the maximum shifting amount of the intermediate helicoid 6 of this embodiment in the direction of the optical axis is equal to the gear length C plus the shifting amount of the gear 8 minus the gear length of the gear 8 (=B+D shown in FIG. 2). That is, the camera shown in FIG. 2 is thinner than that in FIG. 5 by the shifting amount B of the gear 8.

The present invention is not limited to the above-mentioned embodiment, but includes various modification and variations. Though, in this embodiment, the present invention is applied to the lens barrel of zoom lens of two groups type, it can be applied also to a lens barrel of mono-focal type and that of multi-focal type. Also, the present invention may be applied to a zoom lens which is not collapsed.

As described above in detail, according to the present invention, the driving gear engaged with the rotary cylinder is movable in the direction of the optical axis. Accordingly, the maximum shifting amount of the rotary cylinder in the direction of the optical axis can be increased, and the camera body can be further thinned.

What is claimed is:

1. A lens barrel comprising:
   a fixed cylinder;
   a driving gear which is rotated by the rotational driving force from a driving means and which moves forward and backward, according to the directions of its rotation, in the direction of an optical axis;
   a rotary cylinder which has an external gear formed around its outer periphery to be engaged with said driving gear, and which is rotated by said driving gear to shift with the driving gear forward and backward, according to the directions of its rotation, with respect to said fixed cylinder in the direction of the optical axis; and
   a lens holding cylinder for holding a photographing lens which is engaged with said rotary cylinder and shift forward and backward, according to the directions of rotation of said rotary cylinder, in the direction of the optical axis.

2. A lens barrel according to claim 1, wherein said driving gear has a screw portion and shifts forward and backward in the direction of the optical axis according to the lead of said screw portion, and said rotary cylinder has a screw portion and shifts forward and backward in the direction of the optical axis according to the lead of its screw portion.

3. A lens barrel according to claim 2, wherein the lead of the screw portion of said driving gear is different from the lead of the screw portion of said rotary cylinder.

* * * * *